United States Patent
Perrin et al.

(10) Patent No.: US 10,372,396 B2
(45) Date of Patent: Aug. 6, 2019

(54) DISCOVERY AND CONNECTION TO WIRELESS DISPLAYS

(71) Applicant: Lenovo (Singapore) Pte. Ltd., Singapore (SG)

(72) Inventors: Steve Richard Perrin, Raleigh, NC (US); Scott Edwards Kelso, Cary, NC (US); Matthew Price Roper, Raleigh, NC (US); Matthew Lloyd Hagenbuch, Durham, NC (US); Song Wang, Cary, NC (US); Bradley Park Strazisar, Cary, PA (US)

(73) Assignee: Lenovo ( Singapore) Pte. Ltd., Singapore (SG)

( * ) Notice: Subject to any disclaimer, the term of this patent is extended or adjusted under 35 U.S.C. 154(b) by 142 days.

(21) Appl. No.: 13/772,889

(22) Filed: Feb. 21, 2013

(65) Prior Publication Data
US 2014/0232618 A1  Aug. 21, 2014

(51) Int. Cl.
*G06F 3/14* (2006.01)
*G09G 5/00* (2006.01)
*H04L 12/24* (2006.01)
*H04W 4/02* (2018.01)
*H04W 4/80* (2018.01)

(52) U.S. Cl.
CPC .............. *G06F 3/14* (2013.01); *G09G 5/006* (2013.01); *H04L 41/22* (2013.01); *H04W 4/023* (2013.01); *H04W 4/80* (2018.02); *G09G 2330/021* (2013.01); *G09G 2370/047* (2013.01); *G09G 2370/16* (2013.01)

(58) Field of Classification Search
CPC ................................. G09G 2370/16
USPC ................................... 345/1.1–2.3
See application file for complete search history.

(56) References Cited

U.S. PATENT DOCUMENTS

| | | | |
|---|---|---|---|
| 8,982,820 B1* | 3/2015 | Cordeiro | H04W 48/16 370/329 |
| 2007/0270119 A1* | 11/2007 | Dorogusker | H04W 52/32 455/343.5 |
| 2008/0158438 A1* | 7/2008 | Maeda et al. | 348/744 |
| 2009/0061870 A1* | 3/2009 | Finkelstein | H04W 48/20 455/435.2 |
| 2009/0092075 A1* | 4/2009 | Corson | H04W 40/244 370/328 |
| 2009/0196200 A1* | 8/2009 | Moritomo | H04W 16/00 370/254 |

(Continued)

*Primary Examiner* — Amr A Awad
*Assistant Examiner* — Stephen A Bray
(74) *Attorney, Agent, or Firm* — Ference & Associates LLC

(57) ABSTRACT

An aspect provides a method, including: receiving, from a wireless display device, one or more beacons using a receiver of an information handling device; using, at the information handling device, the one or more beacons to determine one or more wireless display device characteristics; initiating, at the information handling device, one of a plurality of wireless connection protocols determined based on the one or more wireless display device characteristics; establishing, using a communication module of the information handling device, a wireless connection with the wireless display device; and transmitting, with the communication module of the information handling device, data for display to the wireless display device. Other aspects are described and claimed.

21 Claims, 4 Drawing Sheets

(56) References Cited

U.S. PATENT DOCUMENTS

| | | | |
|---|---|---|---|
| 2010/0271959 A1* | 10/2010 | Qi | H04L 41/12 370/248 |
| 2011/0096197 A1* | 4/2011 | Kusaka et al. | 348/231.5 |
| 2011/0148754 A1* | 6/2011 | Inagaki et al. | 345/156 |
| 2012/0017257 A1* | 1/2012 | Lee et al. | 725/153 |
| 2012/0257543 A1* | 10/2012 | Baum et al. | 370/255 |
| 2012/0282906 A1* | 11/2012 | Frye | H04W 4/04 455/414.2 |
| 2012/0284517 A1* | 11/2012 | Lambert | H04L 63/0823 713/169 |
| 2013/0137373 A1* | 5/2013 | Choi | H04B 5/0031 455/41.1 |
| 2013/0265178 A1* | 10/2013 | Tengler | H04W 4/00 340/989 |

* cited by examiner

DISCOVERY AND CONNECTION TO WIRELESS DISPLAYS

BACKGROUND

Information handling devices ("devices") come in a variety of forms, for example desktop and laptop computing devices, tablet computing devices, kiosks, smart phones, e-readers, MP3 players, and the like. Many such devices are configured for mobile use and for use with other information handling devices, e.g., wireless display devices. Users often wish to employ a wireless display device in connection with a personal, mobile information handling device, e.g., tablet computing device, given the wireless display's enhanced display capabilities.

In terms of connecting to a wireless display, existing connection solutions have a unique and often proprietary display manager application that is specific to a technology and/or a vendor. The user then must know in advance which application to use with a given wireless display and pair it manually, e.g., via employing a selection from their device's display manager application.

BRIEF SUMMARY

In summary, one aspect provides a method, comprising: receiving, from a wireless display device, one or more beacons using a receiver of an information handling device; using, at the information handling device, the one or more beacons to determine one or more wireless display device characteristics; initiating, at the information handling device, one of a plurality of wireless connection protocols determined based on the one or more wireless display device characteristics; establishing, using a communication module of the information handling device, a wireless connection with the wireless display device; and transmitting, with the communication module of the information handling device, data for display to the wireless display device.

Another aspect provides an information handling device, comprising: a receiver; a communication module; one or more processors; and a memory operatively coupled to the one or more processors that stores instructions executable by the one or more processors to perform acts comprising: receiving, from a wireless display device, one or more beacons using the receiver; using the one or more beacons to determine one or more wireless display device characteristics; initiating one of a plurality of wireless connection protocols determined based on the one or more wireless display device characteristics; establishing, using the communication module, a wireless connection with the wireless display device; and transmitting, with the communication module, data for display to the wireless display device.

A further aspect provides a program product, comprising: a storage medium having computer program code embodied therewith, the computer program code comprising: computer program code configured to receive, from a wireless display device, one or more beacons using a receiver of an information handling device; computer program code configured to use, at the information handling device, the one or more beacons to determine one or more wireless display device characteristics; computer program code configured to initiate, at the information handling device, one of a plurality of wireless connection protocols determined based on the one or more wireless display device characteristics; computer program code configured to establish, using a communication module of the information handling device, a wireless connection with the wireless display device; and computer program code configured to transmit, with the communication module of the information handling device, data for display to the wireless display device.

A still further aspect provides a wireless display device, comprising: a wireless networking device that transmits one or more beacons to a receiver of an information handling device, the one or more beacons including information for determining one or more wireless display device characteristics; establishing, using a communication module of the wireless display device, a wireless connection with the wireless display device and the information handling device; and receiving, with a communication module of the wireless display device, data for display at the wireless display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
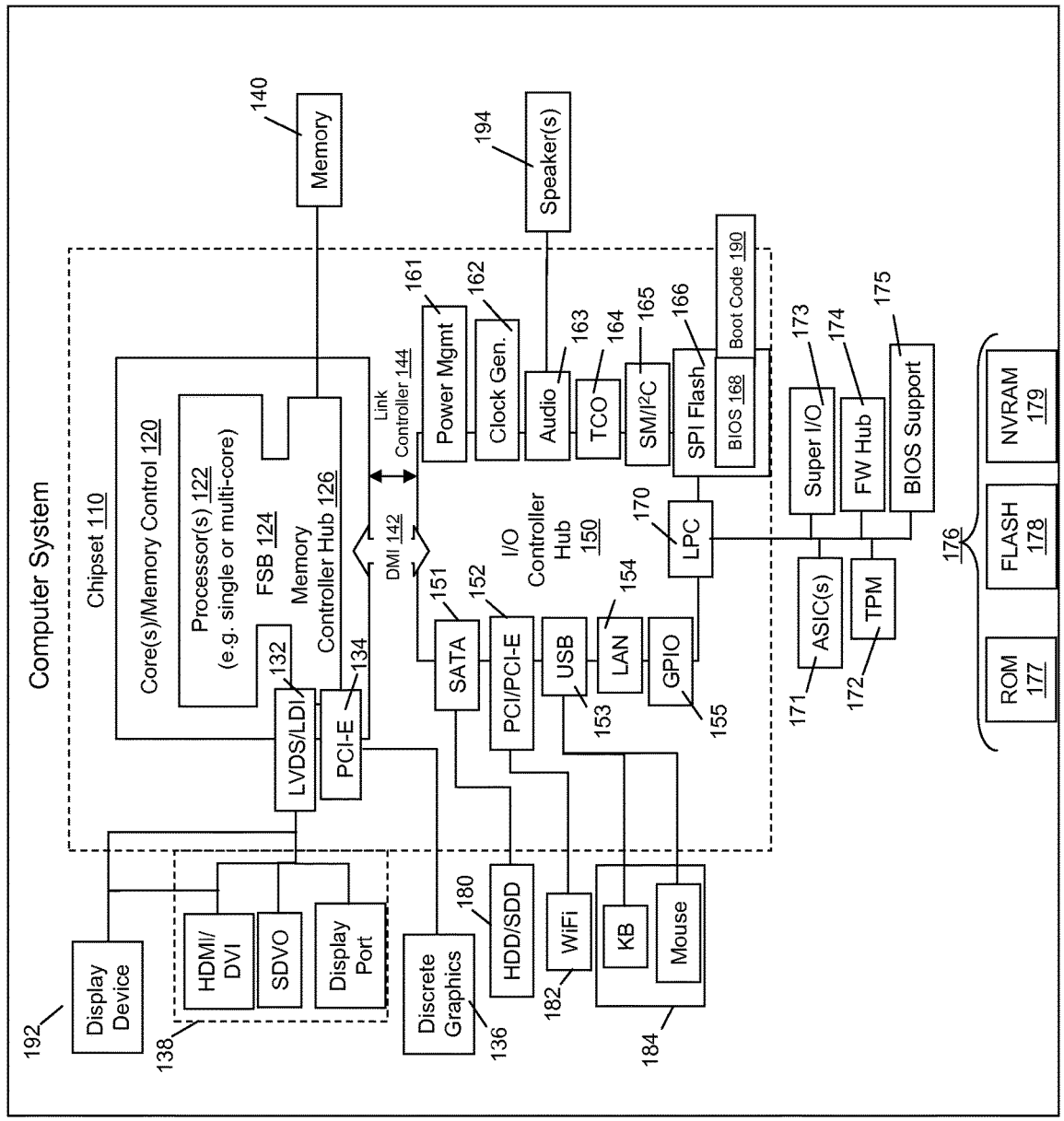
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Existing connection solutions have a unique and often proprietary display manager application that is specific to a technology and/or a vendor. Even if future solutions for connecting an information handling device with a wireless display follow a model of a network connection manager, such a model would simply aggregate management functions for multiple technologies in a single application. Thus, such a solution would still require the user to navigate a complex application to select a wireless display device and make a connection thereto.

Accordingly, an embodiment provides a mechanism by which a user may connect his or her information handling device, e.g., a laptop PC or tablet device, to a wireless display device without ever invoking a graphical user interface or otherwise encountering a confusing connection manager application. The user may thus indicate an intention to wirelessly connect to a specific wireless display using a natural action, such as placing the device in question in a specific area or zone or in close proximity to a wireless display device. The action may be as simple as (or simpler than) inserting a cable for a wired connection. Additionally, an embodiment provides that this natural connection is enabled "out of the box", i.e., without having the user run configuration software.

Depending upon the activity that the user is doing, the wireless display that is in use may implement any of a variety different wireless technologies. For example, the wireless technology in a projector or television (TV) might be optimized for low cost (e.g., INTEL WiDi protocol, MIRACAST protocol, or the like) while the technology in a desktop monitor might be optimized for ergonomics and installation density. Information handling devices (e.g., laptop PCs, tablets and the like) may support multiple wireless display technologies. However, for the user, an embodiment creates a common connection experience that hides the differences in the underlying technologies and thus makes the wireless connection process transparent.

An embodiment also saves power. For example, a laptop PC may discover the wireless displays in its vicinity using the appropriate radios. For such a discovery process to be accomplished, the radios are powered on and are actively scanning for the displays. In this state, the power consumed by the radios has a measurable impact on battery life. Accordingly, an embodiment provides a mechanism by which the information handling device radios may be powered on in an intelligent fashion, sparing battery life for mobile devices.

The illustrated example embodiments will be best understood by reference to the figures. The following description is intended only by way of example, and simply illustrates certain example embodiments.

Figure 2:
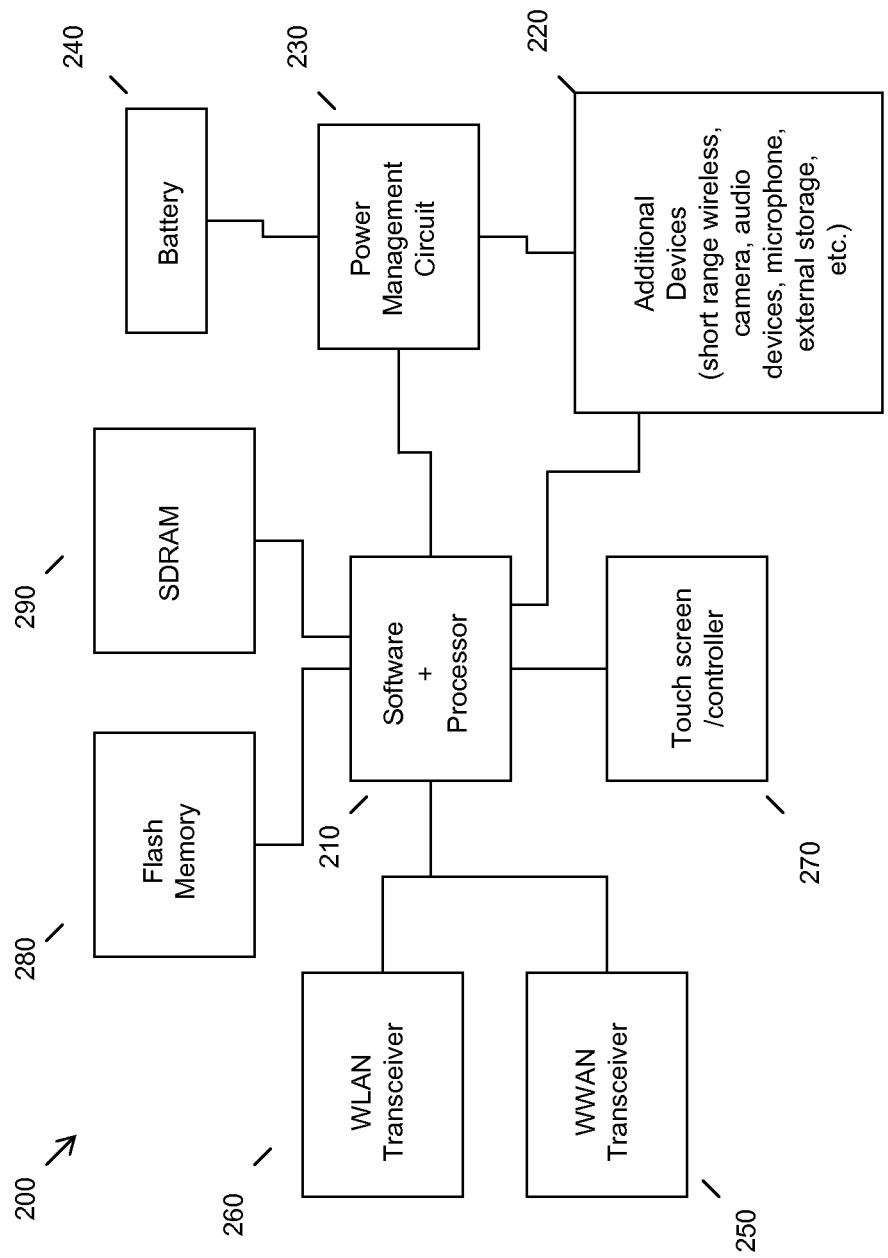
FIG. 2 illustrates another example information handling device and components thereof.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, which may be used in connection with managing battery cells, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide wireless connections to wireless display devices using a variety of protocols. Embodiments provide mechanisms by which various information handling devices, such as those outlined in FIG. 1 and FIG. 2, may connect to wireless displays in an intelligent fashion irrespective of the exact underlying wireless technology implemented by the wireless display device. Accordingly, an embodiment provides methods by which information handling devices may automatically discover and connect to wireless displays. For example, in a room or space with many wireless displays available, the user may initiate a wireless connection to a given wireless display with a simple gesture indicating an intent to connect.

Figure 3:
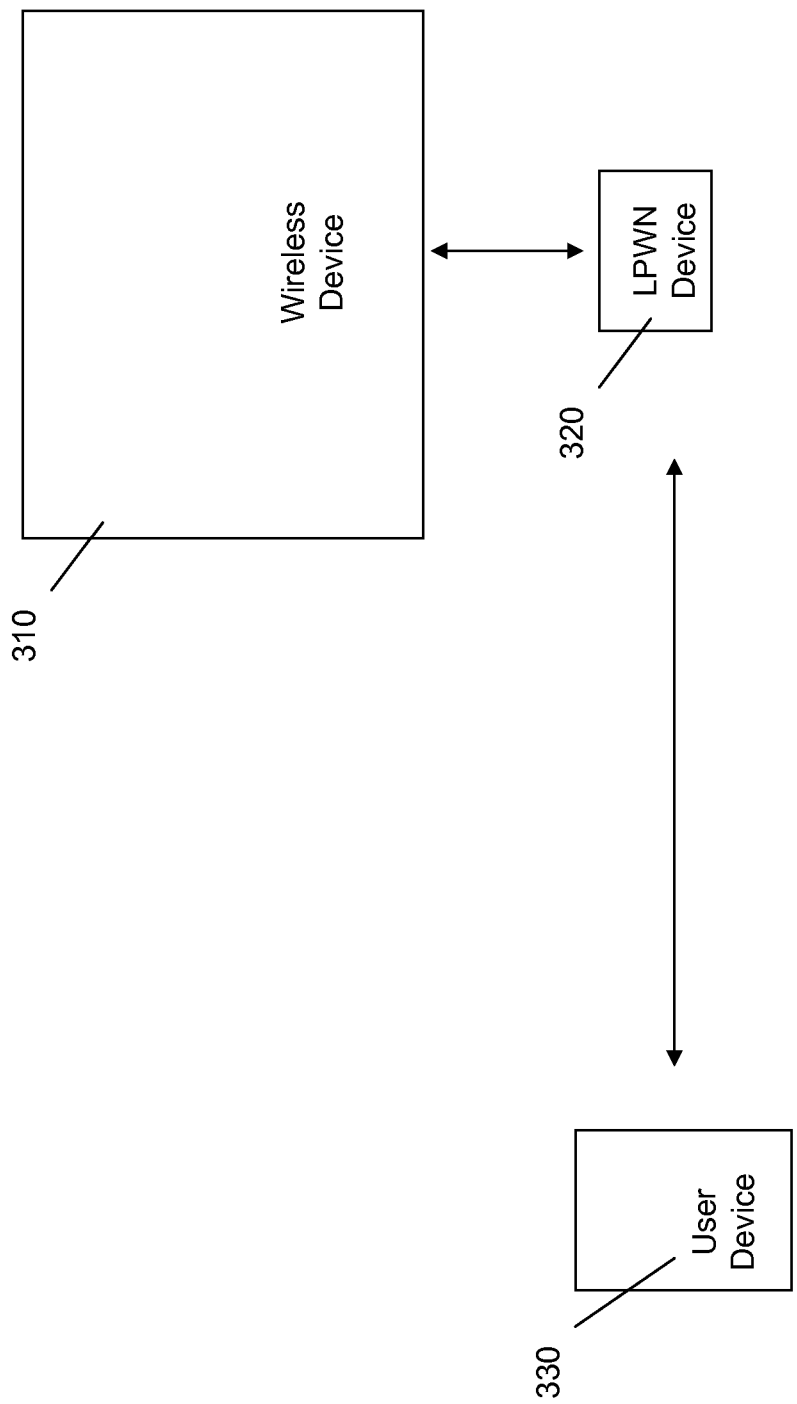
FIG. 3 illustrates an example operating environment including an information handling device and a wireless display.

Referring to FIG. 3, in an embodiment a specific wireless display 310 is matched to one or more low power wireless networking (LPWN) device(s) 320. The LPWN device(s) 320 may be integrated or separable from the wireless display 310, or a suitable combination of the foregoing. The LPWN device(s) 320 have information describing unique properties of their matched wireless display 310. More than one LPWN device 320 may be matched to a given wireless display 310. Example LPWN devices include but are not limited to a BLUETOOTH LE beacon producing device, and a near field communication (NFC) tag device.

The LPWN device(s) 320 publishes services supported by the wireless display 310. For example, the LPWN device(s) 320 may provide information regarding a number of wireless displays 310 available, wireless display 310 name(s) or address(es) (e.g., MAC address, IP address, or the like), wireless protocols that are supported by the wireless displays 310 (e.g., WIGIG protocol, INTEL WiDi protocol, MIRACAST protocol, WHDI protocol, or the like), extended display identification (EDID) data for the wireless display(s) 310, a uniform resource indicator (URI) where a device may obtain above information, etc.

The LPWN device 320 may publish additional information or facts, e.g., that a display is currently available or in use. A user's information handling device 330 may initiate a connection when it enters a zone by being able to receive the beacon, e.g., a provided by a LPWN device 330. A zone may be defined in a variety of ways, for example by a BLUETOOTH LE proximity/radius, via a NFC contact, by an indoor location (e.g., as ascertained through GPS, triangulation, or the like) or any suitable location mechanism. The device 330 may use a threshold to determine when the device 330 has entered a zone or location or proximity with respect to another device, e.g., a wireless display 310. The device 330 may use a different threshold to determine when it has left the zone or location or is not in proximity.

A wireless connection policy may be based on the type of wireless display 310. For example, for a desktop display or monitor as the wireless display 310, an embodiment may establish a connection between the wireless display 310 and the device 330 when placed on a desktop. The connection may be disconnected when removed from the desktop. As another example, using a TV as a wireless display 310, an embodiment may establish a wireless connection between the wireless display 310 and the user's device 330 when the device comes within a predetermined distance or proximity, e.g., 1 meter of the wireless display 310. A disconnection in this situation may be accomplished via manual interface with the device 330 or automatically, e.g., using the same or a different proximity or location threshold or determination.

Thus, an embodiment may employ a variety of policies to establish connections and accomplish disconnects. As another example, using an indoor location determination, e.g., as ascertained via an appropriate location service (e.g., a wireless connection identification, or like means), an embodiment may define a zone where the device 330 is to establish certain connections with wireless display(s) 310. For example, a user may define zones where he or she wants connections to be made.

A user preference or history may also be utilized to modify or establish connection policies. For example, if a user places his or her device 330 in new zone and a user manually connects the device to a wireless display 310, the user may cause the device 330 to remember the zone and the connection policy. In this case, the user may manually press a button to "remember this location". The device 330 will thus store and remember the indoor location coordinates such that the next time the device 330 approaches within a predetermined distance of or enters into this location; the device 330 connects to the wireless display 310 automatically.

Figure 4:
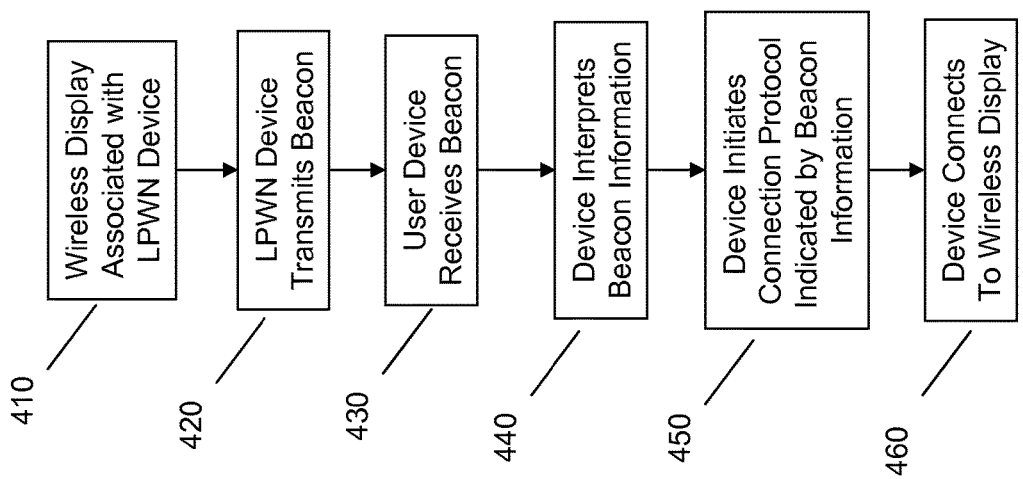
FIG. 4 illustrates an example method of wirelessly connecting a wireless display device and an information handling device.

Referring generally to FIG. 4, an embodiment provides automated connectivity to a variety of wireless devices using an efficient mechanism that saves power and permits connectivity to wireless displays employing a variety of wireless communication protocols.

In an embodiment, in a step 410 wireless display devices are associated with a communication device, for example a LPWN device. The association may be via integration of a communication device or module within the wireless display or via providing a communication device that is paired with a wireless device. The communication device provides the wireless display with the ability to broadcast information, e.g., broadcasting a beacon or beacons containing information for identifying wireless display device characteristics and connecting with the device.

In a step 420, the communication device, e.g., LPWN device, transmits beacons with the wireless display device information. The LPWN device may for example transmit a BLUETOOTH LE beacon containing the beacon information. The wireless display device thus broadcasts information about itself to the surrounding environment. The beacon information may include all information necessary for connection (e.g., a complete set of wireless display device characteristics) or a subset of information necessary (e.g., a resource locator pointing to a store of information for deriving the wireless display device characteristics, e.g., as retrieved from a cloud device or other remote device).

A user device may receive the beacon transmitted by the LPWN device at 430. The information may be ensured as receivable by choosing a common broadcast/receipt mechanism, e.g., BLUETOOTH LE, irrespective of the wireless display device underlying protocol (e.g. MIRACAST protocol) used for display data transfer. Accordingly, when a user device enters an environment where one or more wireless displays are transmitting information, the user device may receive the information via a suitable communication means, e.g., a BLUETOOTH LE receiver. The use of a low power receiver in the user device for receiving the wireless display information being broadcast permits battery savings, which may be important in the case of a mobile device.

In a step 440, the user device interprets the beacon information. As described herein, the beacon information may include various data that not only informs the device of which wireless display(s) are available, but how close (e.g., via beacon strength), what the address of the wireless display device is (e.g., for connecting thereto), what communication protocol(s) the wireless display utilizes (e.g., INTEL WiDi protocol, WIGIG protocol or the like) for powering on various subsystems of the user device, and other information, e.g., if the wireless display is currently in use or is available to the device.

Given the beacon information regarding the wireless display(s) in the surrounding environment, the device is enabled to execute the appropriate protocol for wirelessly connecting with one or more of the wireless displays. Thus, the device may initiate an appropriate connection protocol from a plurality of possible protocols as indicated by the beacon information at 450. For example, the device may determine, e.g., based on indoor location, geographic location, user history, beacon strength, a combination of the foregoing, or the like, that a wireless display is available and should be connected thereto.

Moreover, the device will determine, using the beacon information, which communication protocol the wireless display operates with. Thus, the device may automatically start the various communication subsystems (e.g., WIGIG radio) needed to establish a wireless connection with the wireless display device for display data transfer. The user's device may therefore automatically connect to or pair with the wireless display device and afford the user with a seamless connection ability at 460 by automatically connecting with the wireless display device.

As described herein, a variety of techniques or policies may be established or modified for connectivity. Disconnection may also be accomplished as a matter of policy. For example, connection and disconnection may be automatically performed based on one or more predetermined parameters such as proximity, device type, location, zone, user preference/history, or the like. Additionally, by virtue of relying on wireless display received information, the user's device is not burdened with continuously powering various communication radios and searching for/discovering wireless displays. A single, low powered radio (e.g., BLUETOOTH LE communication transmitters/receivers) may be established as the beacon send/receive mechanism, affording significant power savings in the devices in question. Thus, in response to receiving a low power beacon, a user's device may choose to implement more power-intensive applications used for wireless connection and data transfer.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, from a wireless display device, one or more beacons using a receiver of an information handling device not connected to the wireless display device;
using, at the information handling device, the one or more beacons to determine one or more wireless display device characteristics;
selecting, at the information handling device, one of a plurality of wireless display connection protocols determined based on the one or more wireless display device characteristics;
identifying a physical location having the ability to connect the information handling device to the wireless display device;
identifying an area within the physical location at which a user previously manually connected the information handling device to the wireless display device;
determining, using a processor, whether the information handling device is positioned in the area;
thereafter establishing, responsive to determining that the information handling device is in the area, a wireless connection with the wireless display device;
automatically initiating, at the information handling device, the one of a plurality of wireless display connection protocols determined based on the one or more display device characteristics; and
transmitting, with the information handling device, data for display to the wireless display device.

2. The method of claim 1, wherein the one or more wireless display device characteristics comprise one or more of wireless display device identification, address of the wireless display device, and a resource locator associated with the wireless display device.

3. The method of claim 1, wherein the one or more wireless display device characteristics comprise wireless display device availability information.

4. The method of claim 1, wherein the one or more beacons include a proximity indication.

5. The method of claim 4, further comprising:
determining a wireless display is within a predetermined proximity to the information handling device prior to initiating, at the information handling device, one of a plurality of wireless display connection protocols determined based on the one or more display device characteristics.

6. The method of claim 1, further comprising determining a zone in which the information handling device currently resides.

7. The method of claim 6, further comprising:
determining the information handling device currently resides within a predetermined zone prior to initiating, at the information handling device, one of a plurality of wireless display connection protocols determined based on the one or more display device characteristics.

8. The method of claim 7, wherein the determining a zone in which the information handling device currently resides is performed independently of communication with the wireless display device.

9. The method of claim 1, wherein the using, at the information handling device, the one or more beacons to determine one or more wireless display device characteristics further comprises obtaining from a remote device the one or more wireless display device characteristics using resource locator information contained in the one or more beacons.

10. The method of claim 1, wherein the selecting, at the information handling device, one of a plurality of wireless display connection protocols determined based on the one or more wireless display device characteristics comprises:
selecting from a predetermined set of wireless display connection protocols using a display type included in the one or more wireless display device characteristics, wherein the display type is associated with a proprietary wireless display communication protocol.

11. The method of claim 10, wherein the display type supports one but not another of the predetermined set of wireless display connection protocols.

12. An information handling device, comprising:
a receiver;
one or more processors; and
a memory operatively coupled to the one or more processors that stores instructions executable by the one or more processors to:
receive, from a wireless display device, one or more beacons using the receiver of the information handling device, wherein the information handling device is not connected to the wireless display device;
use the one or more beacons to determine one or more wireless display device characteristics;
select one of a plurality of wireless display connection protocols determined based on the one or more wireless display device characteristics;
identify a physical location having the ability to connect the information handling device to the wireless display device;
identify an area within the physical location at which a user previously manually connected the information handling device to the wireless display device;
determine, using a processor, whether the information handling device is positioned in the area;
thereafter establish, responsive to determining that the information handling device is in the area, a wireless connection with the wireless display device;
automatically initiate, at the information handling device, the one of a plurality of wireless display connection protocols determined based on the one or more display device characteristics; and
transmit data for display to the wireless display device.

13. The information handling device of claim 12, wherein the one or more wireless display device characteristics comprise one or more of wireless display device identification, address of the wireless display device, and a resource indicator associated with the wireless display device.

14. The information handling device of claim 12, wherein the one or more wireless display device characteristics comprise wireless display device availability information.

15. The information handling device of claim 12, wherein the one or more beacons include a proximity indication.

16. The information handling device of claim 15, wherein the processor:
determines a wireless display is within a predetermined proximity to the information handling device prior to initiating one of a plurality of wireless display connection protocols determined based on the one or more display device characteristics.

17. The information handling device of claim 12, wherein the processor determines a zone in which the information handling device currently resides.

18. The information handling device of claim 17, wherein the processor determines
the information handling device currently resides within a predetermined zone prior to initiating, at the information handling device, one of a plurality of wireless display connection protocols determined based on the one or more display device characteristics.

19. The information handling device of claim 12, wherein the using the one or more beacons to determine one or more wireless display device characteristics further comprises obtaining from a remote device the one or more wireless display device characteristics using resource indicator information contained in the one or more beacons.

20. A program product, comprising:
a non-signal storage device having computer program code embodied therewith, the computer program code being executable by a processor and comprising:
computer program code that receives, from a wireless display device, one or more beacons using a receiver of an information handling device not connected to the wireless display device;
computer program code that uses, at the information handling device, the one or more beacons to determine one or more wireless display device characteristics;
computer program code that selects, at the information handling device, one of a plurality of wireless display connection protocols determined based on the one or more wireless display device characteristics;
computer program code that identifies a physical location having the ability to connect the information handling device to the wireless display device;
computer program code that identifies an area within the physical location at which a user previously manually connected the information handling device to the wireless display device;
computer program code that determines whether the information handling device is positioned in the area;
computer program code that thereafter establishes, responsive to determining that the information handling device is in the area, a wireless connection with the wireless display device;
computer program code that automatically initiates, at the information handling device, the one of a plurality of wireless display connection protocols determined based on the one or more display device characteristics; and
computer program code that transmits data for display to the wireless display device.

21. A wireless display device, comprising:
a display device;
a wireless networking device that transmits one or more beacons to a receiver of an information handling device not connected to the wireless display device, the one or more beacons including one or more of one or more wireless display device characteristics including wireless display availability data or a resource locator therefor;
said transmitting comprising transmitting data for automatically initiating, at the information handling device, one of a plurality of wireless display connection protocols based on the one or more display device characteristics;
identifying a physical location having the ability to connect the information handling device to the wireless display device;
identifying an area within the physical location at which a user previously manually connected the information handling device to the wireless display device;
determining, using a processor, whether the information handling device is positioned in the area;
thereafter establishing, responsive to determining that the information handling device is in the area and using a communication module of the wireless display device, a wireless connection with the wireless display device and the information handling device; and
receiving, with a communication module of the wireless display device, data for display at the wireless display device.

* * * * *